Nov. 21, 1933.  C. L. EKSERGIAN  1,935,701
MANUFACTURE OF WIRE WHEELS
Original Filed Jan. 27, 1931
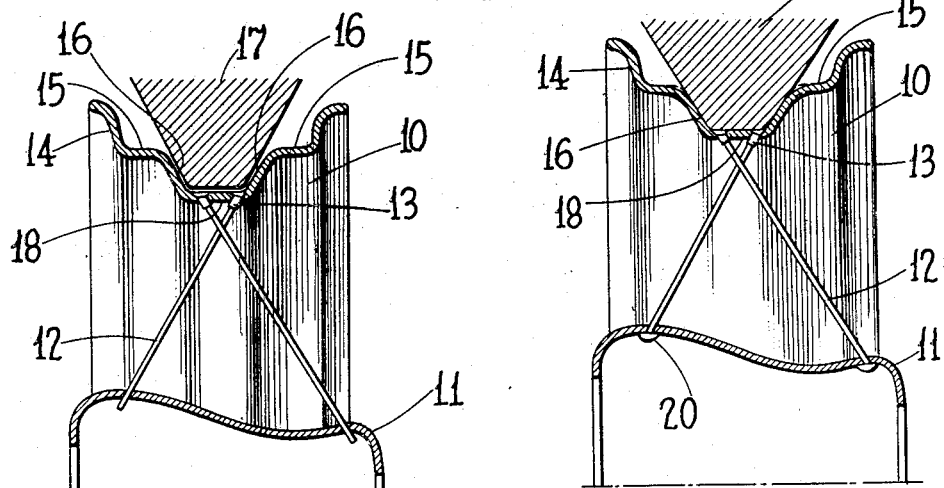
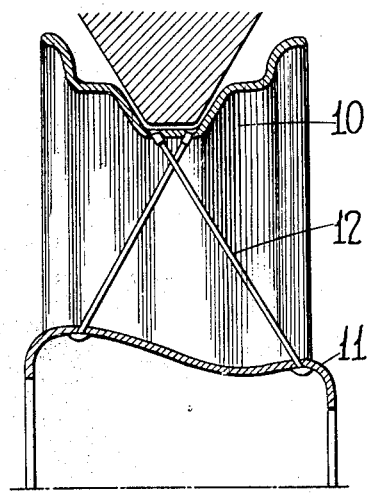
INVENTOR.
CAROLUS L. EKSERGIAN
BY
John P. Tarbox
ATTORNEY.

Patented Nov. 21, 1933

1,935,701

UNITED STATES PATENT OFFICE 1,935,701

MANUFACTURE OF WIRE WHEELS

Carolus L. Eksergian, Detroit, Mich., assignor to Budd Wheel Company, Philadelphia, Pa., a corporation of Pennsylvania Application January 27, 1931, Serial No. 511,483
Renewed March 31, 1933

7 Claims. (Cl. 29—159.02)

My invention relates to the art of vehicle tension wheels and methods of manufacturing such wheels. It is particularly concerned with wire spoked wheels of the riveted or welded type, although certain of its aspects are applicable to other types of tension wheels.

It has been my object to devise a method of tensioning wheels of this type which should be simpler and more effective than those of the prior art. The tensioning of such a wheel by flexure of the hub or rim member within its elastic limit during the securement of the spokes and the subsequent release of the flexing pressure to allow the natural resilience of the flexed member to effect the desired tension has heretofore been proposed. My improved method has a generic similarity to such prior methods, although it is superior to them by reason of the fact that I take advantage of the maximum resilience of the flexed member in carrying my method into effect.

Further features, objects and advantages of my invention and the method whereby I have carried them out will be obvious from a reading of the sub-joined specification in the light of the attached drawing, in which, Figure 1 is a central axial section through the wire wheel illustrating the first step in my method.

Figure 2 is a similar view illustrating an intermediate step, and

Figure 3 is a similar view illustrating the final step.

Referring to the drawing by reference characters, the wheel which my invention is designed to produce consists of a rim member 10 and a hub member 11 interconnected by a plurality of wire spokes 12 which, in the present case, are of the riveted type having heads 13 adapted to seat in suitable sockets in the rim and riveted inner ends 20 secured within the hub shell.

As my invention is best applicable to a rim of the drop center type it has been illustrated in connection with such a rim. This rim consists of a pair of tire bead retaining flanges 14 merging into bead seats 15 which in turn merge into drop center side portions 16 interconnected by a drop center base portion 18. The spoke heads 13 are adapted to seat in depressions in this drop base portion of the rim.

In carrying my invention into effect, the hub and rim may be concentrically located by means of any suitable supporting and jigging mechanism and I have accordingly omitted illustration of any specific mechanism for this purpose. After the concentric location of these members the spokes are inserted into the depressed portions of the rim with their heads 13 received within the depressions and their offset ends extending through openings in the hub. After the insertion of these spokes, a series of contracting dies 17 are applied to the heads thereof within the drop base portion of the rim. These dies are preferably arranged symmetrically about the entire periphery of the rim and thus act uniformly upon every individual spoke location.

After the contraction dies are firmly seated upon the heads of the spokes, contracting pressure is uniformly applied to each of them. This contraction pressure effects a flexure of the rim within its elastic limit in two separate and distinct dimensions, each of which has an important function in connection with the attainment of the ultimate desired tension in the spoke. In the first place, the rim is circumferentially contracted either locally or generally to stress the metal thereof. This radial movement of the elements of the periphery of the drop base portion is not completely participated in by the axial portions of the rim removed therefrom. The flanges and bead seating portions of the rim tend to resist the tendency toward circumferential contraction with the drop base portion, and the drop base portion is therefore subjected to a greater contraction than these outer portions. As a consequence of this fact, the depth of the rim is increased and the radii of curvature of the exterior angles connecting the outlying portions with the drop base portion are increased as indicated in Figure 2, the dotted lines indicating the position of these parts before the contraction, and the full lines their positions after the contracting operation has been performed. It should be noted that the axial, as well as the circumferential flexure of the rim is within its elastic limit.

While the rim is held in this condition with the contracting dies holding the spoke heads 13 firmly against their seats, the hub ends of the spokes are riveted over against the inner circumference of the metal of the hub shell. Upon the release of the pressure by the retraction of the contracting dies, the rim tends to spring back to its normal circumferential and axial conditions of curvature. This exerts a pull on the heads 13 of the spokes and consequently tensions the entire spoke body simultaneously and uniformly.

As a result of my invention, I am enabled to take advantage of the axial as well as the circumferential elasticity of the portions of the rim and thus obtain a maximum resilient effect in producing the desired spoke tension. This axial flexure and the manner in which I have produced it constitute highly important features of my invention, as the maximum amount of circumferential distortion of an ordinary automobile rim within its elastic limit is not great and it is accordingly desirable to take advantage of every possible mechanical factor in effecting spoke tension by a flexure of this kind.

While I have illustrated my invention in connection with a wire wheel of the riveted type, it will be obvious that it might also be applied to wheels of the welded type or any other type in which the securement may take place, while one of the members is held in a flexed condition. It will also be obvious that the method may be practiced in connection with other types of rim than the drop center rim as illustrated. Although I believe it to have its best field of application in connection with the drop center rim, any rim which is capable of lateral flexure incident to the application of pressure to one of its parts may be utilized in connection with my method.

Other modifications will be obvious to those skilled in the art and I do not therefore wish to be limited except by the terms of my sub-joined claims as interpreted in the light of the prior art and the generic spirit of my invention.

What I claim is:

1. The method of forming a vehicle wheel consisting of hub and rim members interconnected by spokes, which comprises flexing one of said members axially within its elastic limit by pressure applied to a central axial portion thereof, securing the spokes in their final condition with respect to said members while the member is flexed, and thereafter releasing the pressure to allow the natural resilience of the flexed member to effect the desired tension by reason of its tendency to resume its normal shape.

2. The method of forming a vehicle wheel consisting of hub and rim members interconnected by spokes which comprises flexing a rim member axially within its elastic limit by pressure applied to a central axial portion thereof securing the spokes in their final condition with respect to said members, while the member is flexed, and thereafter releasing the pressure to allow the natural resilience of the rim to effect the desired tension by reason of its tendency to resume its normal shape.

3. The method of forming a vehicle wheel consisting of hub and rim members interconnected by spokes, which comprises axially flexing the rim member within its elastic limit by the application of pressure thereto, securing the spokes in their final condition with respect to said members while the rim member is held in flexed condition, and thereafter releasing the flexing pressure to allow the natural resilience of the rim to effect the desired tension by reason of its tendency to resume its normal shape.

4. The method of forming a vehicle wheel consisting of hub and rim members interconnected by spokes which comprises flexing the rim member both axially and circumferentially within its elastic limit by the application of pressure thereto, securing spokes in their final condition with respect to the hub and rim members while the rim member is so flexed and thereafter releasing the pressure to allow the natural resilience of the flexed member to effect the desired tension by reason of its tendency to resume its normal shape.

5. The method of forming a vehicle wheel consisting of hub member and a drop center rim member interconnected by spokes, which comprises applying pressure to the base portion of said drop center rim member to the exclusion of other portions thereof to flex it within its elastic limit, securing the spokes in their final condition with respect to said members while the rim member is so flexed, and thereafter releasing the pressure to allow the natural resilience of the rim member to effect the desired tension by reason of its tendency to resume its normal shape.

6. The method of forming a vehicle wheel consisting of a hub member, a drop center rim member, and a series of spokes interconnecting said hub and rim members, which comprises flexing said drop center rim member axially within its elastic limit, securing the spokes in their final condition with respect to said members while the rim member is held in flexed condition, and thereafter releasing the flexing pressure to allow the natural resilience of the rim to effect the desired tension by reason of its tendency to resume its normal shape.

7. The method of forming a vehicle wheel consisting of a hub member, a rim member, and a series of headed spokes interconnecting said hub and rim members, which comprises inserting said spokes through aligned openings in the hub and rim members, and exerting pressure upon the heads of the spokes to effect an axial flexure of one of said members and retain said spokes firmly seated against said member, securing the opposite ends of the spokes to the other member while so held, and releasing the flexing pressure to effect the desired tension of the spokes by reason of the tendency of the flexed member to resume its normal shape.

CAROLUS L. EKSERGIAN.